United States Patent [19]

Young et al.

[11] Patent Number: 4,671,572

[45] Date of Patent: * Jun. 9, 1987

[54] ADJUSTABLE CHAIR HAVING ROLLER CAM ADJUSTMENT MECHANISM

[75] Inventors: Ronald L. Young, Menominee, Mich.; Eugene F. Rock; David E. Brandt, both of Marinette, Wis.

[73] Assignee: Erda, Inc., Marinette, Wis.

[*] Notice: The portion of the term of this patent subsequent to May 13, 2003 has been disclaimed.

[21] Appl. No.: 746,268

[22] Filed: Jun. 19, 1985

Related U.S. Application Data

[63] Continuation-in-part of Ser. No. 565,172, Dec. 23, 1983, Pat. No. 4,588,226.

[51] Int. Cl.$^4$ .............................. A47C 3/18; B60N 1/02
[52] U.S. Cl. ..................................... 297/349; 248/425; 297/344
[58] Field of Search ................ 297/349, 344; 248/416, 248/425; 74/531

[56] References Cited

U.S. PATENT DOCUMENTS

| 464,588 | 12/1891 | Rollert | 297/347 |
| 629,036 | 7/1899 | Koenigkramer | 297/349 X |
| 935,480 | 9/1909 | Fischer | 297/349 X |
| 3,926,396 | 12/1975 | Hall et al. | 297/349 X |
| 4,223,947 | 9/1980 | Cremer | 297/367 |

FOREIGN PATENT DOCUMENTS

| 510360 | 1/1955 | Italy | 297/373 |
| 463559 | 5/1975 | U.S.S.R. | 297/349 |

Primary Examiner—Kenneth J. Dorner
Assistant Examiner—Peter R. Brown
Attorney, Agent, or Firm—Schwartz, Jeffery, Schwaab, Mack, Blumenthal & Evans

[57] ABSTRACT

The adjustable chair can be used in aircraft, motor homes, or the like. The chair includes a seat mounted on a base. The seat is infinitely adjustable both in translation and rotation. A locking mechanism is provided for easily and automatically locking the chair in position on the base or releasing the chair for adjustment.

8 Claims, 8 Drawing Figures

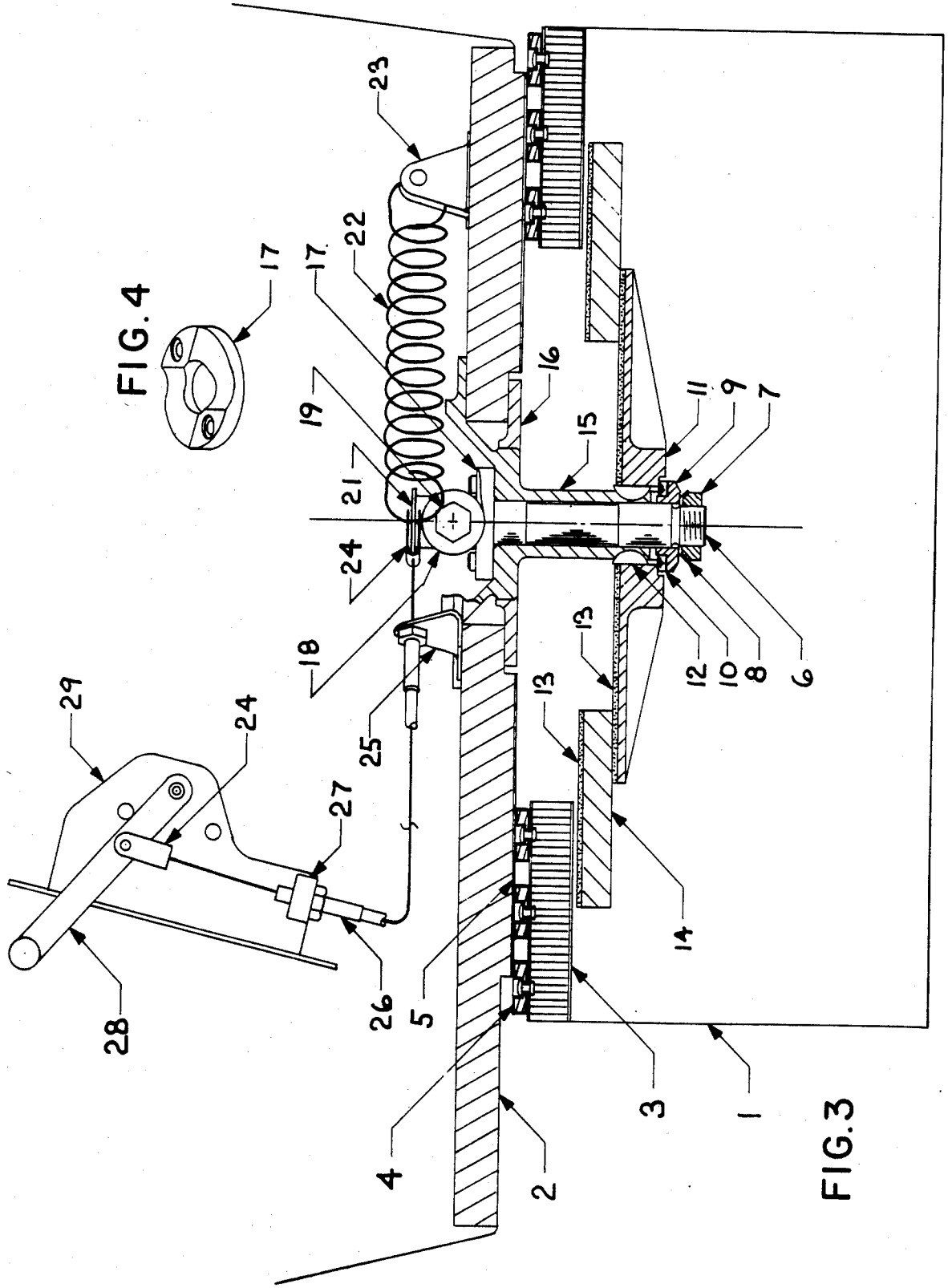

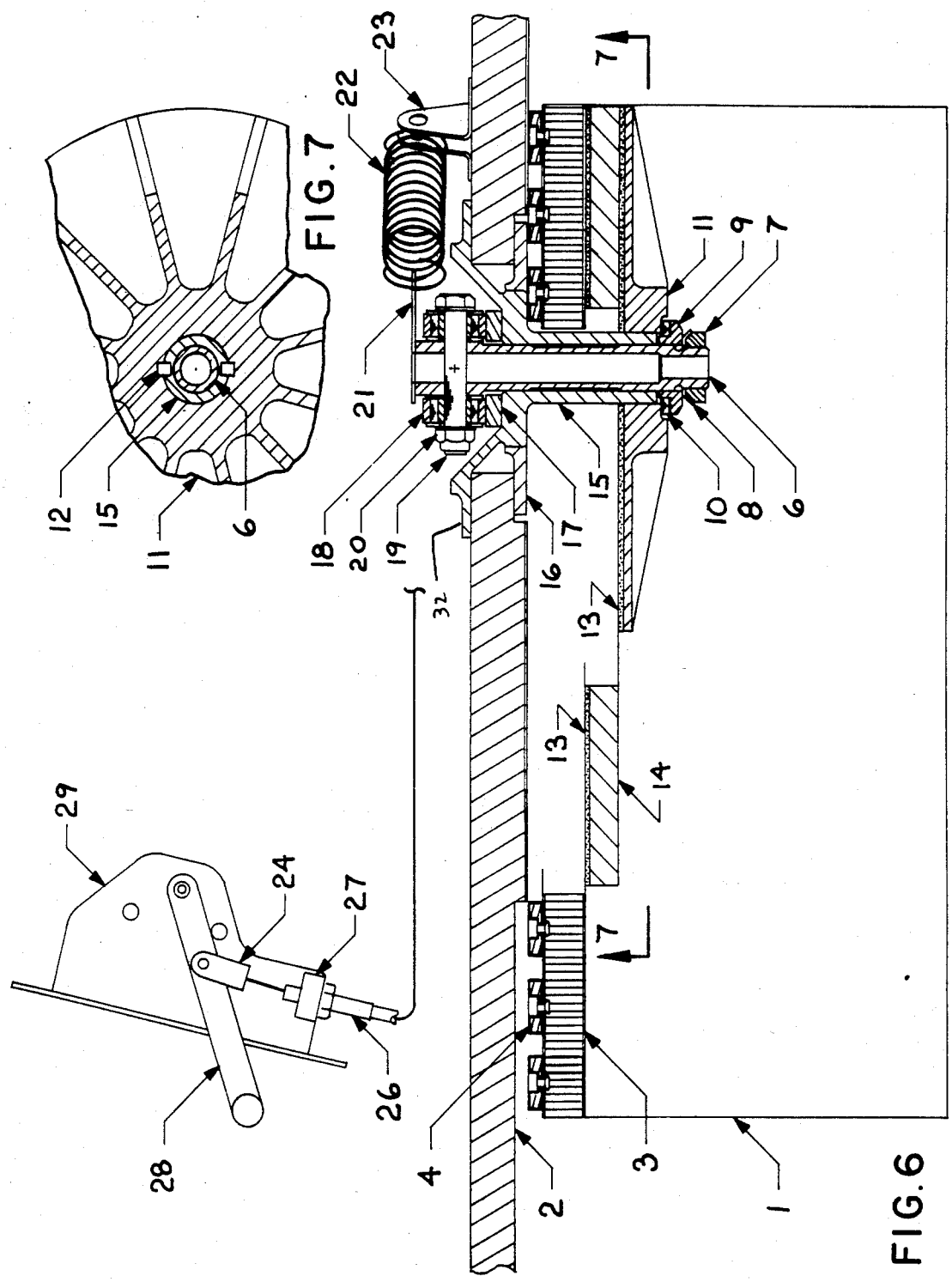

4,671,572

ADJUSTABLE CHAIR HAVING ROLLER CAM ADJUSTMENT MECHANISM

CROSS REFERENCE TO RELATED APPLICATIONS

This is a continuation-in-part of U.S. application Ser. No. 565,172, filed Dec. 23, 1983, now U.S. Pat. No. 4,588,226 issued 5/13/86, the disclosure of which is incorporated herein by reference.

BACKGROUND OF THE INVENTION

The present invention relates to an adjustable chair for aircraft, recreational vehicles and the like, and relates more particularly to a chair having a single mechanism by means of which lateral, longitudinal and swiveling movement can be effected.

Many airplanes, particularly corporate aircraft, have club or lounge sections equipped with chairs capable of various adjustments, including fore-and-aft, lateral, swiveling, and reclining movement, or various combinations of these. At least during takeoff and landing, the chair is normally locked in a fore or aft facing position with the back in an upright position. When the aircraft is not in a takeoff or landing mode, the chair can be moved in the directions indicated, swiveled, or reclined to any desired position of the occupant, within the travel limits of the chair mechanism.

Furthermore, it has become customary to include adjustable seats in recreational vehicles to permit the driver's and passenger's seats to face forward when traveling and to face in an arbitrary orientation when the vehicle is parked.

Prior to the present invention, adjustable chairs of the type described normally accommodated longitudinal and lateral travel by tracks, with the actual movement being performed manually or by power assisting means including pins or friction locking. Heretofore, the swiveling movement of the chair has normally been indexed by means of pins.

Regardless of the type of mechanism employed for accomplishing movement in the several directions indicated, prior art adjustable chairs of this general type have been commonly characterized as having a non-rigid feeling when locked, have been relatively inconvenient to adjust by virtue of the locking pins which require manipulation by the occupant, and by the relatively limited positions of movement. Where a wide range of movement has been provided for in prior art adjustable chairs, the mechanisms permitting such adjustments have been uniformly characterized by their relatively complicated and thus costly construction.

SUMMARY OF THE INVENTION

With the above in mind, a principal objective in accordance with the present invention is to provide an adjustable chair provided with a single mechanism by means of which the chair can be locked into position, or unlocked for horizontal or swiveling movement. The mechanism includes a lever accessible to the occupant adjacent the top and front of one of the arms of the chair, or any other conveniently accessible position on the movable seat.

The mechanism permitting adjustment of the chair is further characterized in that when locked, a rigid friction lock is effected between the stationary supporting base for the chair and the seat base. This rigidity is important not only in permitting the chair to be absolutely maintained in its locked position, but to essentially eliminate any movement between the seat base and the stationary supporting base which might lead to impaired operation of the adjustment mechanism.

A still further advantage of the adjustment mechanism is its simplified construction and consequent low manufacturing costs. There are a minimum of moving parts involved, thereby reducing maintenance problems and costs. The relatively simple construction permits part of the mechanism to be mounted within the seat portion of the chair, thereby greatly reducing the components exposed at the exterior of the chair. This permits the adjustment mechanism to be readily adaptable to various chair configurations, and also to constructions other than chairs were lateral and longitudinal motion is desired to be provided for but in a controlled manner.

A still further, significant advantage of the invention is the infinite positions of movement into which the seat can be adjusted. There are limits to lateral and longitudinal sliding movement of the seat relative to the supporting base, but within these limits the seat can be moved to an almost infinite number of positions, and subsequently locked. This permits the seat to be moved to the most comfortable position for the occupant.

Another advantage of the present invention is that the adjustment mechanism is easily operated. It provides a large holding force when engaged yet requires only a small force for disengagement.

These and other objects will become apparent as the following description proceeds, in particular reference to the application drawings.

BRIEF DESCRIPTION OF THE DRAWINGS

In the application drawings:

FIG. 3 is a side elevational view, partially in vertical section showing the roller cam mechanism in the released position;

FIG. 4 is a perspective view of the cam from the roller cam mechanism;

FIG. 6 is a side elevational part fragmentary sectional view showing the roller cam mechanism in the clamped position with the chair at an extreme limit of travel;

FIG. 7 is a bottom plan sectional fragmentary view taken along line 7—7 of FIG. 6.

DETAILED DESCRIPTION OF THE PREFERRED EMBODIMENT

Figure 1:
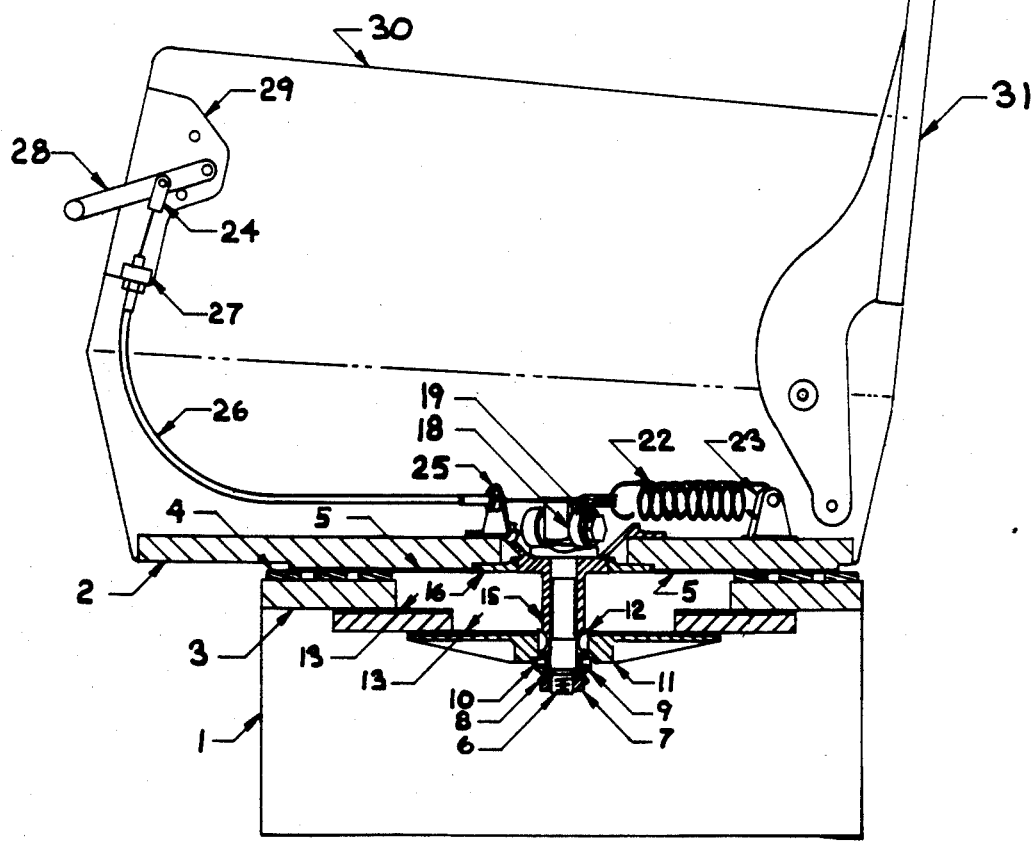
FIG. 1 is a side elevational view, partially in vertical section, showing the adjustable chair constructed in accordance with the present invention.
Figure 5:
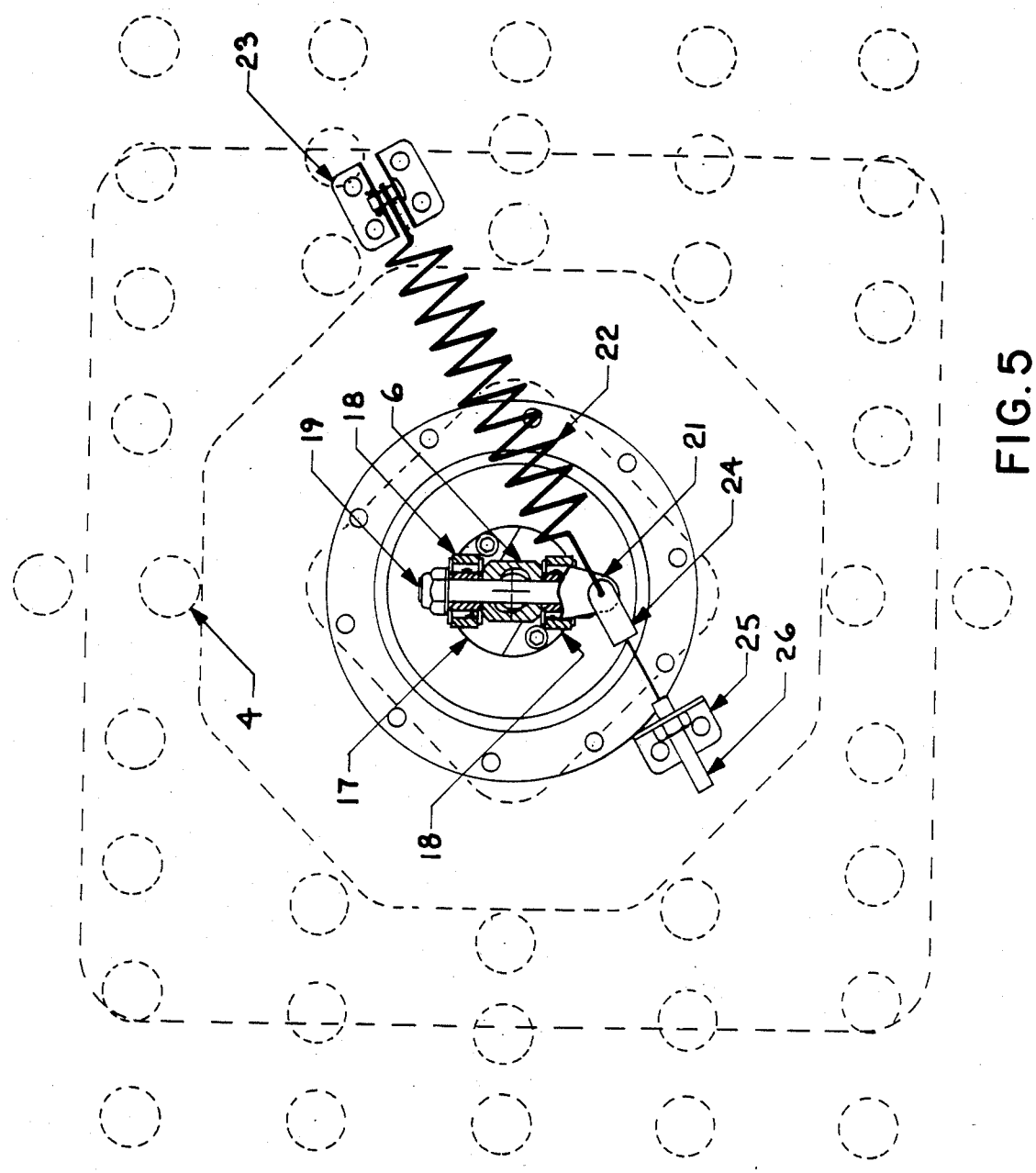
FIG. 5 is a top plan view of the roller cam mechanism of the present invention in the clamped position.
Figure 8:
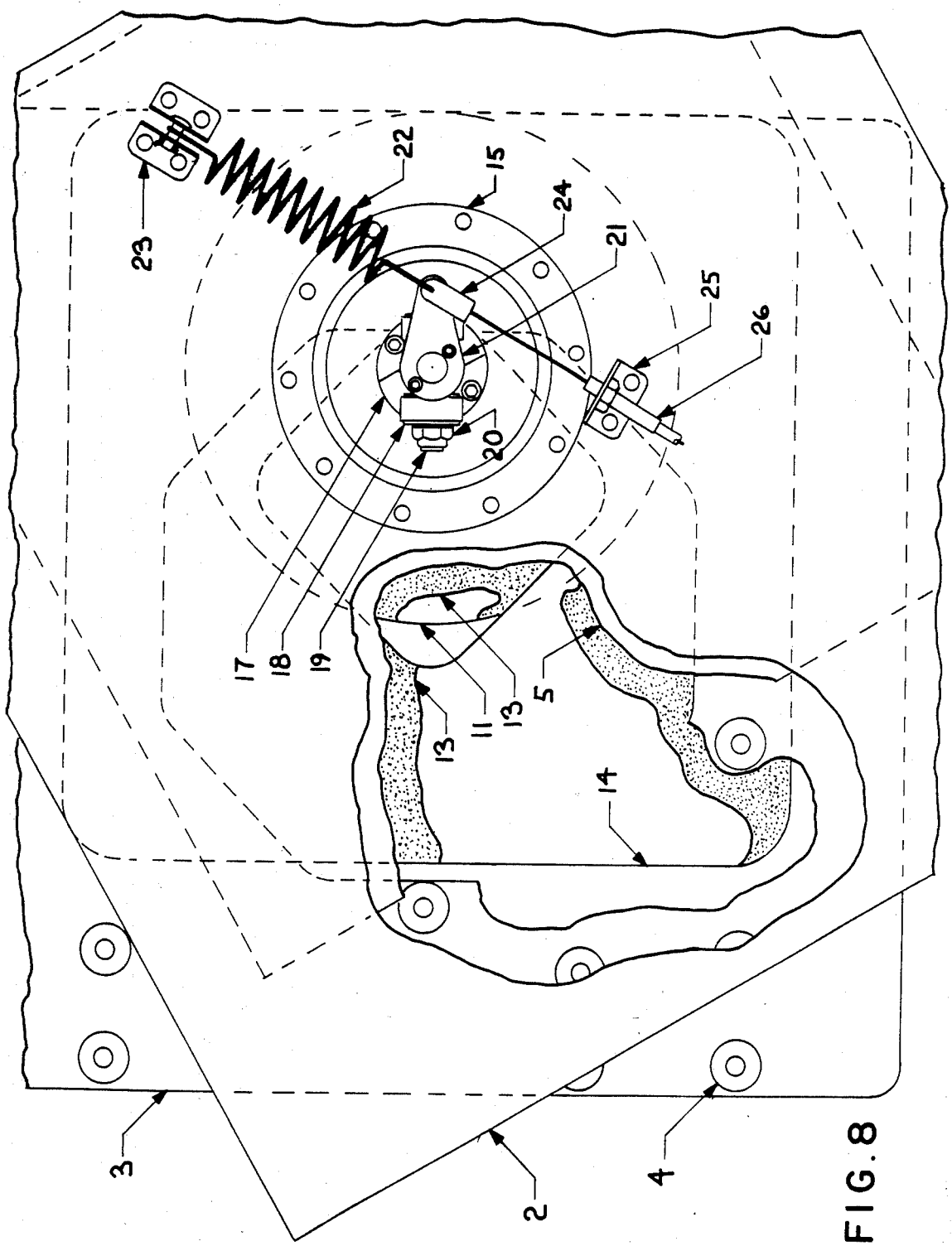
FIG. 8 is a top plan view of the roller cam mechanism with portions broken away.

Referring now to the application drawings, wherein the parts are indicated by like reference numerals, and initially to FIG. 1, the adjustable chair of the present invention is generally indicated at 1, with the seat structure 2 of the chair being mounted on a supporting base which includes a top plate 3. Bearing buttons 4 are attached to the top of plate 3 and support the weight of seat structure 2. These bearing buttons are made of a low coefficient of friction material, such as a synthetic resin, to permit the seat structure to slide freely on plate 3. A metal sliding surface 5 is formed on the bottom of seat structure 2. Sliding surface 5 contacts these bearing buttons to facilitate the sliding action of the seat structure 2.

It will be understood that the mechanical structures only of the chair 1 are shown in the drawings. All upholstery and the like, have been omitted for clarity. A seat arm rest 30 and the seat back 31 as shown schematically.

With particular reference to FIGS. 2 through 8, it will be seen that the invention also includes a mechanism for locking the seat structure 2 onto the base top plate 3. This mechanism includes a spindle 6 which receives a nut 7 and a lock washer 8 mounted to hold a bearing cage 9 against a thrust bearing 10. Thrust bearing 10 is positioned against the lower surface of a lower brake plate 11 which is vertically slidable on the outer surface of a chair post 15. Chair post 15 receives keys 12 which are mounted in key slots in the lower brake plate 11 to permit vertical but not rotational movement of brake plate 11.

Spindle 6 is vertically slidable inside of chair post 15 which is a hollow tubular structure. Accordingly, it can be seen that if spindle 6 is moved upwardly, upward pressure is applied to lower brake plate 11 through nut 7, lock washer 8, bearing cage 9, and thrust bearing 10.

The upper surface of lower brake plate 11 has brake friction material 13 bonded or otherwise applied to it. Material 13 can be any conventional braking material. An upper brake plate 14 rests on brake material 13 and is movable relative to lower brake plate 11. Brake material 13 is also bonded or otherwise applied to the upper surface of upper brake plate 14. The upper surface of upper brake plate 14 is positioned below base top plate 3.

There is sufficient space between bearing cage 9 and the bottom of chair post 15 to permit spindle 6 to move upwardly by a sufficient amount to cause a tight frictional engagement between brake plate 11 and brake plate 14, and between brake plate 14 and the bottom surface of base top plate 3.

It will be noted that there is a relatively large opening in base top plate 3 to permit a relatively large adjustment of seat structure 2 before chair post 15 abuts base top plate 3. This opening can be circular to permit sliding adjustment in any direction. Also, it will be noted that the chair can be turned in any angular orientation at any position of the seat structure 2 relative to the opening in base top plate 3. Accordingly, a large degree of translational and/or rotational adjustment is permitted.

It will also be noted that the diameter of lower brake plate 11 is less than the diameter of the opening in base top plate 3 and that the upper brake plate 14 is ring-shaped. Upper brake plate 14 has an inner diameter less than the outer diameter of lower brake plate 11 and an outer diameter which is greater than the diameter of the opening in base top plate 3. Thus, there will always be enough area of upper brake plate 14 to insure that the opening in base top plate 3 is bridged regardless of the position of the seat structure 2. As shown in FIG. 3, the seat structure is located centrally of the opening in base top plate 3 and the upper brake plate 14 fills the gap between the outer periphery of lower brake plate 11 and the inner periphery of the opening in base top plate 3. FIG. 6 shows the seat structure 2 moved to an extreme limit of travel where a portion of both lower brake plate 11 and upper brake plate 14 is positioned beneath base top plate 3. It will be understood that contact around the entire circumference of the opening in base top plate 3 is not required to provide a stable locking engagement of the seat structure 2. And it will also be understood that sufficient overlap between lower brake plate 11, upper brake plate 14 and the base top plate 3 will always be present to provide a secure engagement at any position between those shown in FIGS. 3 and 6.

Again, referring to FIGS. 3 and 6, it will be seen that spindle 15 is fixedly mounted to seat structure 2. An upper annular flange 32 is formed integrally with chair post 15 and rests on the top surface of the lower portion of seat structure 2. A lower annular flange is formed by a nut 16 which threadedly engages chair post 15. Accordingly, nut 16 can be tightened against the lower surface of seat structure 2 to hold chair post 15 in position.

A cam 17 is mounted on top of chair post 15 by the use of bolts or the like. The shape of cam 17 is shown most clearly in FIG. 4. Cam 17 is ring-shaped and has an upper sinusoidal helix surface. Spindle 6 extends through chair post 15 and through the center of cam 17. Two roller bearings 18 are mounted on opposite sides of spindle 6 on a bolt 19 which passes through spindle 6. The roller bearings 18 are held in position by a nut 20 received on the threaded end of bolt 19.

Roller bearings 18 and cam 17 form a roller cam release mechanism which controls the vertical position of spindle 6. As spindle 6 is rotated, roller cams 20 riding on the upper surface of cam 17 produce a non-linear vertical displacement of spindle 6. Accordingly, when the roller bearings 18 to ride to the highest point on cam 17, upper pressure is applied through lower brake plate 11 and upper brake plate 14 to base top plate 3, thereby locking the seat structure 2 in position. When the roller bearings 18 are moved to the lowest position on cam 17, the pressure from the brake plates is released and the seat structure is permitted to freely slide upon buttons 4, thereby permitting the occupant to change the seat orientation to any translational or rotational position desired. FIG. 3 shows the released position of the roller cam mechanism where the seat is unlocked and FIG. 1 shows the locked position of the roller cam release mechanism.

Referring to FIGS. 2, 3, 5, 6, and 8, it will be seen that a lever 21 is attached to the upper surface of spindle 6 by bolts, screws or the like. A spring 22 has one end attached to lever 21 and a second end attached to a spring bracket 23, which is mounted on seat structure 2. Spring 22 keeps the roller release mechanism in the locked position by pulling the roller bearings to the highest point on cam 17. The slope of cam 17 is zero at locked position giving neutral stability. The helix surface of cam 17 is also undercut so that the roller bearings come up against neutral stops at both ends of travel. Thus, the spring 22 keeps the roller bearings against these neutral stops. A cleavis 24 is also mounted on lever 21 for connecting the cable assembly of a cable assembly 26 to the lever 21. The sheath of cable assembly 26 is connected through a cable bracket 25 to seat structure 2. The opposite end of the cable assembly is connected to a cable lock 27 and the cable is connected to a hand lever 28 through a second cleavis 24. A lever support 29 is mounted in a position to insure accessibility of lever 28. As shown in FIG. 1, lever support 29 can be mounted to arm structure 30 of the seat structure 2.

Figure 2:
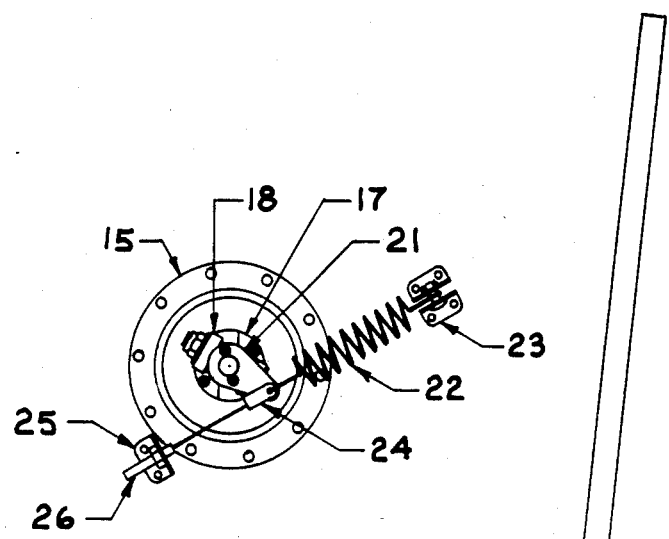
FIG. 2 is a top plan view of the roller cam mechanism of the present invention in the released position.

The cam mechanism is normally held in the locked position by spring 22, which rotates lever 21 to the position shown in FIGS. 1 and 2. To release the mechanism, lever 28 is moved to the position shown in FIG. 3, which rotates lever 21. Lever 21 being attached to spindle 6 rotates spindle 6. The two roller bearings 18 ride on the cam 17. Rotation of spindle 6 against spring 22 allows spindle 6 to drop to a lever position on cam 17. It will be noted that since the cam 17 has a zero slope in the locked position, the occupant of the seat is provided with a high mechanical advantage. That is, only the force of the spring 22 must be overcome in order to release the roller cam mechanism. The force of spring 22 can be adjusted by adjusting the length of lever arm 21 to enable the roller cam mechanism to be released with a minimum of force.

With the cam release mechanism in the released position, the seat structure 2 can be moved laterally, longitudinally and can be swiveled to any position desired. The lateral and longitudinal movement of the seat structure is only limited by the size and the shape of the opening in the base top plate 3 and the size of the upper brake plate 14. When the seat structure is in the desired position, lever 28 is released. Spring 22 rotates the lever 21 to its original position, and thereby also returns lever 28 to its original position.

When mounting the present invention, nut 7 is adjusted until spring 22 can just overcome the applied by the brake plates against the roller cam mechanism, and then the position of nut 7 is locked by lock washer 34. Once the mechanism has been rigged, the only necessary adjustment for wear is nut 7. Also, by removing nut 7, the seat structure can be removed from its base.

The provision of upper brake plate 14 permits a greater amount of adjustability with a smaller base structure. As can be seen in FIG. 1, to provide the same amount of adjustability without using an upper brake plate, the size of the base structure would have to be increased to accommodate a larger lower brake plate. Thus, the upper brake plate permits a smaller base structure to be used.

It will thus be seen that the present invention constitutes an adjustment mechanism which is highly simplified in construction and requires a minimum of force to be applied by the user. Very few moving parts are involved and by release of the mechanism through the operating lever, the chair seat can be moved to its adjusted position and thereafter locked simply by releasing the operating lever.

It will be understood that changes can be made in the system without departing from the basic inventive concepts. For example, the rollers can be rotated to release the brake plates by means other than the cable illustrated. Other modifications to the present invention would be readily apparent to one of ordinary skill in the art. Accordingly, any such modifications and changes would not depart from the scope of the invention as set forth in the pending claims.

What is claimed is:

1. An adjustment mechanism for a chair or the like to permit horizontal and swiveling movement of the chair, comprising:
   a base, having a top plate member with an opening;
   a seat structure having a bottom member with an opening formed therein;
   bearing means interposed between the bottom of said seat structure and the top of said top plate member to permit free movement between said seat structure and said base;
   a chair post connected to said seat structure and extending downwardly through said opening in said seat structure and said top plate member, said chair post being cylindrical and having a center opening, said chair post being smaller in lateral dimension than said top plate member opening to permit lateral movement of said chair post in any direction;
   a shaft extending through said center opening in said chair post;
   brake means supported on a lower end of said shaft for tightly frictionally engaging said top plate of said base for locking said seat in its adjusted position, said brake means comprising a lower brake plate and an upper brake plate disposed between said lower brake plate and said top plate, said upper brake plate having a central opening which is smaller than said lower brake plate such that said upper brake plate overlaps said lower brake plate, said upper brake plate having an outer dimension which is greater than said opening in said top plate member; and
   means for releasing said brake means to permit horizontal and swiveling movement of said chair.

2. The adjustment mechanism of claim 1 wherein said shaft is mounted for rotational and axial movement and including means for causing axial translation of said shaft in response to rotary movement of said shaft comprising a cam and a cam follower connected between said shaft and seat.

3. The adjustment mechanism of claim 2 wherein said cam and cam follower mechanism comprises a cam fixed to said seat and having an upper cam surface, and a cam follower fixed to said shaft, said cam follower being positioned to ride along said cam surface as said shaft is rotated.

4. The adjustment mechanism of claim 3 wherein said cam surface includes sloped sections and sections with zero slope.

5. The adjustment mechanism of claim 2 including means for rotating said shaft comprising a lever extending radially from said shaft, a cable attached to said lever, and a cable actuating mechanism connected to said cable to cause rotation of said shaft in a first direction.

6. The adjustment mechanism of claim 5 wherein said means for rotating said shaft further comprises means for normally biasing said shaft in a second direction of rotation opposite to said first direction of rotation.

7. The adjustment mechanism of claim 3 wherein said cam follower comprises a pair of bearings mounted on opposite sides of said shaft.

8. The adjustment mechanism of claim 1 wherein said lower brake plate has an outer dimension which is smaller than said opening in said top plate member.

* * * * *